Feb. 3, 1953

E. HORTON 2,627,448

STYLUS HOLDER

Filed Oct. 13, 1949

INVENTOR
EDGAR HORTON
BY Elmer J. Gorn
ATTORNEY

Patented Feb. 3, 1953 2,627,448

UNITED STATES PATENT OFFICE 2,627,448

STYLUS HOLDER

Edgar Horton, Braintree, Mass., assignor to Raytheon Manufacturing Company, Newton, Mass., a corporation of Delaware Application October 13, 1949, Serial No. 121,209

3 Claims. (Cl. 346—139)

This invention relates in general to record making devices of the kind which make a record of a phenomenon with a stylus which is maintained in contact with a record medium, and in particular to novel stylus holding means for such devices.

Record making devices are known which mark a record medium by means of electrical impulses applied through a stylus which is maintained in contact with the medium. In such devices, the medium is customarily provided with indicia which, in cooperation with marks produced on the medium, are indicative of the state of a phenomenon being supervised or recorded at the time the marks are made. It is necessary that the stylus be carefully and accurately positioned with respect to the indicia in order that the accuracy of the record produced shall be within desired limits. The stylus should also be adjustable in order to permit adjustment of such limits. In addition, the stylus should be readily removable and replaceable. Similar desiderata apply in the case of record making devices which employ an ink-bearing stylus.

Known stylus holders involve the employment of chucks, clamps, and the like, which all include movable parts, screw threaded members, and jaws, which are usually small parts, difficult to handle and expensive to construct. These chucks, clamps, and the like, are quite heavy as compared with the weight of the stylus itself, with the result that, when the stylus is moved at any appreciable rate of speed with respect to the record medium, difficulty is experienced in obtaining a record of uniform density. In the case of a recording device employing electrical signals which are impressed upon the stylus, the stylus itself is often a small piece of tungsten wire, which is very light in weight.

In accordance with the present invention, a stylus is held by means of three hooks disposed in such relative position that a piece of relatively stiff wire, such as tungsten, suitable for use as a stylus, may be hooked over two hooks and under a third intermediate hook so that it is held in place by friction while being, at the same time, readily adjustable and replaceable. The complete assembly is extremely light in weight, and simple and inexpensive to construct. In accordance with a preferred embodiment of the invention, the three hooks are struck or bent from a sheet of flat stock. Where marking on the record medium is by means of electrical signals applied through the stylus, the flat stock is electrically conductive, e. g., a metal, and means may be provided for applying the signal thereto.

Further advantages and features of the invention will become apparent from the detailed description of a single embodiment thereof which follows, reference being made to the accompanying drawings wherein.

Figures 1, 2, 3, 4:
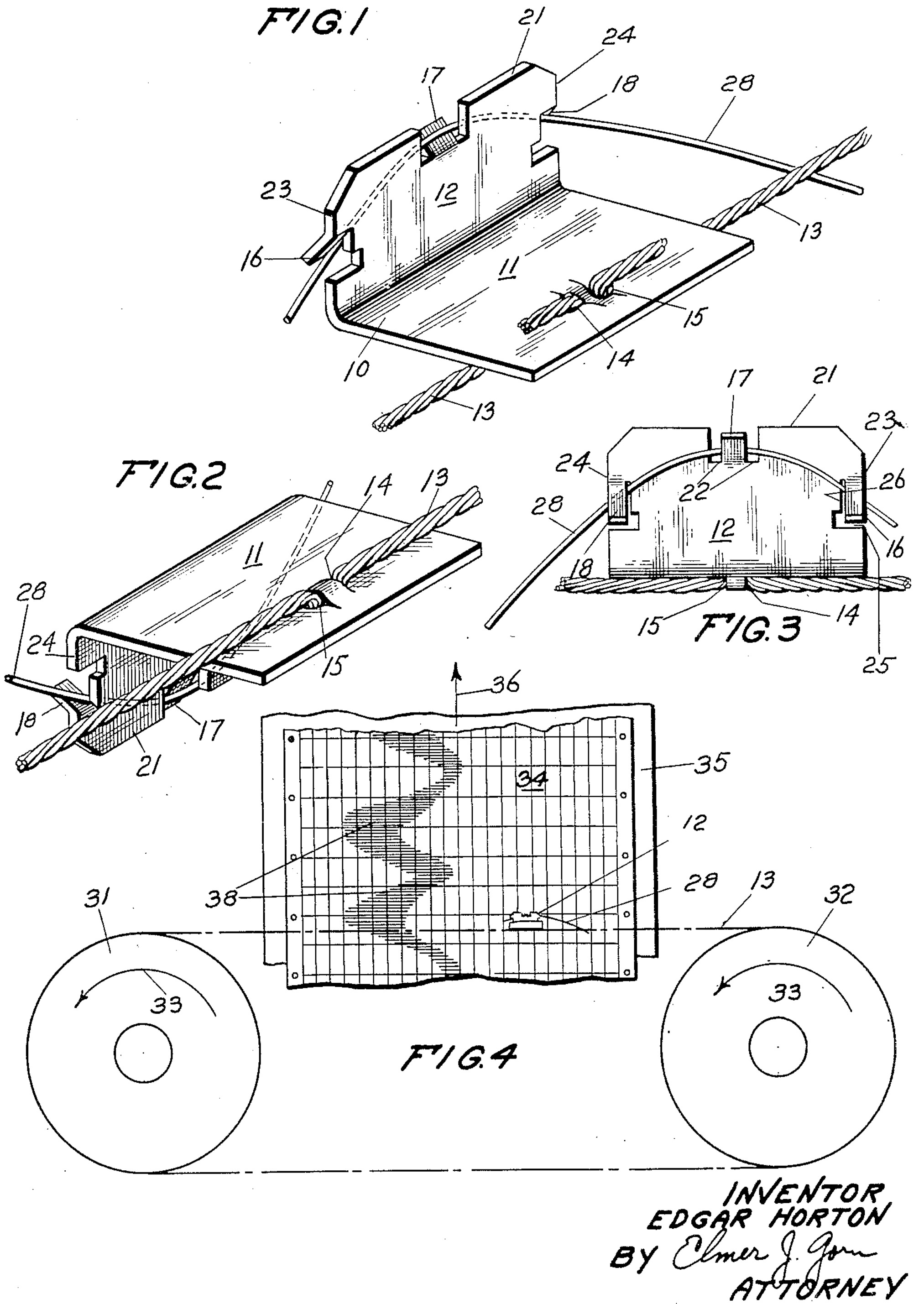
Fig. 1 is an isometric view of a stylus engaged in a holder in accordance with the invention.
Fig. 2 is an isometric view of the reverse side of Fig. 1.
Fig. 3 is a side elevation of Fig. 1.
Fig. 4 is a diagrammatic view illustrating the employment of the invention.

Referring now to Figs. 1 to 3, inclusive, a bracket 10 comprises a base portion 11 and a rectangularly-disposed side portion 12 which serves as a stylus holder. The base portion is engaged with an endless cable 13 which is constructed by locking the ends of the cable material with the base portion through holes 14 and 15 therein. This structure is described in detail and claimed in the copending application of Robert A. Fryklund, Serial No. 119,905, filed October 6, 1949, for Depth Sounder Recorders.

Tht stylus holder 12 is flat and has three lugs or projections 16, 17, and 18 bent or struck therefrom. The intermediate projection 17 is bent out of the stylus holder at the top edge 21 thereof about an axis which is substantially parallel with said top edge. Notches 22 are cut in the stylus holder 12 perpendicular to the top edge 21 to separate the intermediate projection 17 from the main body of the stylus holder.

The end projections 16 and 18 are located at the side edges 23 and 24, respectively, of the stylus holder, and are similarly formed. Thus, a notch 25 is provided perpendicular to the side edge 23 connecting with a second notch 26 parallel to said side edge to define the material of projection 16. This material is then bent to the same side of the stylus holder 12 as the intermediate projection 17 about an axis substantially parallel to the top edge 21. Projection 18 is similarly formed and bent.

Each projection makes an acute angle with the plane of the stylus holder 12. However, the apex of the angle of the intermediate projection 17 is reversely directed to the apexes of the end projections 16 and 18. A piece of stylus wire 28 is engaged in the projections, resting within the apex of each of these angles. The wire, thus, is hooked over the intermediate projection 17 and under the end projections 16 and 18, as viewed in Fig. 3, for example. It will be appreciated that wire 28 can be positioned, adjusted, or replaced in the stylus holder 12 with very little effort and very accurately. If it is desired to apply electrical signals to the wire 28, which operates as a stylus, the bracket 10 may be made of an electrically conductive material. Use of the stylus and holder in this fashion is illustrated in the aforementioned copending application of Robert A. Fryklund.

Referring now to Fig. 4, the stylus holder of the invention may be employed, in connection with a depth sounder recorder, for example, as illustrated therein. The endless cable is engaged with a pair of pulley wheels 31 and 32, disposed in the same plane and having parallel axes of rotation. The pulley wheels rotate in a direction indicated by arrows 33, so that the stylus 28 is moved from right to left as seen in the figure. A sheet-like record medium 34 rests on a plane platen 35, and is moved slowly in the direction of arrow 36. Thus, as stylus 28 is moved repeatedly across the record medium 34, successive marks 38 are made on the record medium. A complete apparatus constructed to function in this manner is described in detail in the aforementioned copending application of Robert A. Fryklund. As will be appreciated by those skilled in the art to which said application pertains, the platen 35 and record medium 34 actually repose in a plane which is parallel to the axes of rotation of the pulley wheels 31 and 32. These elements are illustrated in the plane of the pulley wheels themselves in Fig. 4 merely for convenience in showing diagrammatically how the stylus holder of the invention may be employed.

Many modifications of the invention will occur to those skilled in the art to which this application relates, and it is, therefore, intended that the claims which follow shall not be limited by the particular embodiment herein illustrated and described, but only by the prior art.

What is claimed is:

1. Stylus means comprising, in combination, an elongated flexible member and a mount therefor comprising three stud-like members fixed in position with respect to each other, said member being flexedly engaged with said studs and urged against said studs as said member is drawn across a medium contacted by said member, said studs making contact with said member at three separate points distributed along said member with an intermediate stud on one side thereof and the extreme studs on the opposite side thereof, said member in the region of the intermediate one of said points being thereby displaced in a direction transverse to the long dimension thereof, whereby said member is flexed in said mount and held therein by its own restoring force.

2. Stylus means comprising, in combination, an elongated flexible member, a flat body having a top and two side edges, a first projection bent out of said body at said top edge, second and third projections bent out of said body at said side edges, said projections all lying on the same side of said body, said member being flexedly engaged with said projections and urged against said studs as said member is drawn across a medium contacted by said member, said projections making contact with said member at three separate points distributed along said member with the first projection on one side thereof and the second and third projections on the opposite side thereof, said member in the region of the intermediate one of said points being thereby displaced in a direction transverse to the long dimension thereof, whereby said member is flexed on said body and held thereon by its own restoring force.

3. Stylus means comprising, in combination, an elongated flexible member, a flat body having a top and two side edges, a first projection bent out of said body at said top edge about an axis parallel to said top edge, second and third projections bent out of said body at said side edges each about an axis parallel to said top edge, said projections all lying to the same side of said body and at an acute angle thereto, the apex of the angle of said first projection being oppositely directed to the apexes of the angles of said second and third projections, said member being flexedly engaged with said projections and urged into said apexes as said member is drawn across a recording medium in contact with said member, said projections making contact with said member at three separate points distributed along said member, said member in the region of the intermediate one of said points being thereby displaced in a direction transverse to the long dimension thereof, whereby said member is flexed on said body and held thereon by its own restoring force.

EDGAR HORTON.

REFERENCES CITED

The following references are of record in the file of this patent:

UNITED STATES PATENTS

| Number | Name | Date |
|---|---|---|
| 1,451,022 | Haskell | Apr. 10, 1923 |
| 1,475,227 | Fuguson | Nov. 27, 1923 |
| 1,480,100 | Nelson | Jan. 8, 1924 |
| 2,530,739 | Stamper | Nov. 21, 1950 |

FOREIGN PATENTS

| Number | Country | Date |
|---|---|---|
| 327,287 | Great Britain | Apr. 3, 1930 |
| 615,786 | Great Britain | Jan. 11, 1949 |